United States Patent [19]
Cannon et al.

[11] Patent Number: 6,116,672
[45] Date of Patent: Sep. 12, 2000

[54] INSERT FOR THE MAP POCKET OF A MOTOR VEHICLE

[75] Inventors: Carter Scott Cannon; Jack Van Ert, both of Rochester Hills, Mich.

[73] Assignee: Lear Corporation, Southfield, Mich.

[21] Appl. No.: 08/799,791

[22] Filed: Feb. 12, 1997

[51] Int. Cl.[7] ................................................ B60R 7/04
[52] U.S. Cl. .................................... 296/37.13; 224/547
[58] Field of Search ................................ 296/37.8, 37.9, 296/37.11, 37.13, 37.16, 152, 153; 224/539, 542, 547; 248/314

[56] References Cited

U.S. PATENT DOCUMENTS

| | | |
|---|---|---|
| D. 166,957 | 6/1952 | Ershler . |
| D. 264,894 | 6/1982 | Halder ........................................ D3/40 |
| D. 331,213 | 11/1992 | Weinstock .............................. D12/155 |
| 1,499,452 | 7/1924 | Gay ..................................... 224/547 X |
| 1,518,672 | 12/1924 | O'Connell . |
| 1,625,011 | 4/1927 | Wolfe et al. . |
| 1,700,122 | 1/1929 | DeBoer . |
| 2,911,024 | 11/1959 | Miceli . |
| 4,619,477 | 10/1986 | Kneib et al. .......................... 296/37.13 |
| 4,863,208 | 9/1989 | Streett ................................. 296/37.8 X |
| 5,072,983 | 12/1991 | Muroi et al. ......................... 296/37.13 |
| 5,094,375 | 3/1992 | Wright ................................. 224/542 X |
| 5,199,449 | 4/1993 | Dabringhaus et al. ............. 296/37.9 X |
| 5,379,787 | 1/1995 | Haines ................................ 296/37.9 X |
| 5,584,144 | 12/1996 | Hisano ................................. 296/153 X |

FOREIGN PATENT DOCUMENTS

| | | | |
|---|---|---|---|
| 1387647 | 12/1964 | France ................................ 296/37.13 |
| 2454724 | 5/1976 | Germany .............................. 224/542 |
| 2510220 | 9/1976 | Germany ............................... 296/153 |
| 3230964 | 2/1984 | Germany .............................. 296/37.9 |

OTHER PUBLICATIONS

Photograph of "BMW 530" Door Interior.
Photograph of "Quattro WGN" Door Interior.

*Primary Examiner*—Dennis H. Pedder
*Attorney, Agent, or Firm*—Brooks & Kushman PC

[57] ABSTRACT

An adapter ring useable in a door or map pocket having an orientation within a vehicle is disclosed. The adapter ring is fittable within the door pocket to support a configured bin of standard design within the door pocket irrespective of the orientation of the door pocket. The adapter ring includes a peripheral flange having an outer edge adapted for cooperation with the door pocket to support the adapter ring in the door pocket. The peripheral flange also has an inner edge adapted for cooperation with at least a portion of the configured bin to support the bin within the door pocket. A vehicle door assembly utilizing the adapter ring for optimizing the storage capacity of a door pocket is also disclosed. Also disclosed are various inserts fittable within a door pocket for optimizing the storage capacity of the door pocket.

14 Claims, 4 Drawing Sheets

INSERT FOR THE MAP POCKET OF A MOTOR VEHICLE

TECHNICAL FIELD

The present invention relates generally to vehicle doors, and more particularly, to vehicle door map pockets.

BACKGROUND ART

Most vehicle doors have at their inboard sides a door or map pocket. Vehicle occupants use the door pockets to store various articles or items such as maps, papers, pens and pencils, cassette tapes, etc. Items are often maintained in the door pockets in a disorganized state because the items are smaller than the pockets and, consequently, depending on the nature of the items, tend to freely move about during vehicle operation. Sometimes occupants capriciously dump or place items in the door pockets without attempting to organize them. The items become further mixed and scrambled together in the door pockets as more items are placed therein. Adding further to the chaos and confusion among the items in the door pockets is that the less bulkier items tend to filter towards the bottom of the door pockets. In essence, regardless of whether or not occupants try to orderly arrange the items in the door pockets, the items tend to become jumbled in a disorderly arrangement making it difficult to find and grasp any particular item.

Furthermore, most of the storage capacity of door pockets is not used because the pockets typically have a generic shape which is inefficient for storing arbitrarily shaped items such as those mentioned above. Accordingly, much of the pocket volume is wasted when storing items.

To address these problems, containers having a set of compartments for storing items have been developed for use with door pockets. Some of these containers are insertable within the door pockets while others rest over the pockets. For instance, BMW has offered a coin holder which rests over the opening of the door pocket of its BMW 530 model. However, this holder and other types of known containers use only a portion of the door pocket. Thus, items stored in the other portion of the door pocket are still maintained in a disorganized state. Furthermore, if the container rests over a portion of the door pocket, then other items stored in other areas of the pocket may roll underneath the container. An occupant is then compelled to remove the container to access the items.

Another problem associated with door pockets is that the shapes of pockets vary among vehicle models. Thus, a container fittable within a door pocket of one vehicle model may not fit within the pocket of another vehicle model. Accordingly, many different sized containers having a similar design need to be made for all of the variously shaped door pockets among the vehicle models. Making different sized containers of one design for different vehicle models is efficient if there is only one type of container such as a coin holder.

However, making different sized containers of many designs, such as a CD holder, a storage bin, a trash bin, etc., for different vehicle models is inefficient. A need exists for an adaption or transforming mechanism capable of transforming variously shaped door pockets to a uniform or standardized shape so that only one standardized container for each design needs to be made. In essence, different vehicle models would have uniform or standardized door pockets with the use of the adaption or transforming mechanism.

Similar to the problem associated with differently shaped door pockets among vehicle models is that the shapes of pockets may also vary in one vehicle model. For instance, a driver-side and a passenger-side door pocket may have a similar arbitrary shape which are the mirror images of one another. Thus, a container fitting within the driver-side door pocket may not fit properly within the passenger-side door pocket. Accordingly, two containers of one design need to be made for the two door pockets. A need exists for an adaption or transforming mechanism capable of transforming the shape of the two door pockets to a uniform or standardized shape so that only one standardized container for each design needs to be made.

SUMMARY OF THE INVENTION

Accordingly, it is an object of the present invention to provide an insert for optimizing the storage capacity of a vehicle door pocket.

It is another object of the present invention to provide an insert to subdivide a vehicle door pocket into at least one compartment for storing variously shaped articles.

It is still another object of the present invention to provide an adapter ring for use in a vehicle door pocket having an orientation within a vehicle for supporting a configured bin of standard design within the door pocket irrespective of the orientation of the door pocket.

It is still yet another object of the present invention to provide a vehicle door assembly having a door pocket provided with an adapter ring.

In carrying out the above objects and other objects and features of the present invention, an insert for optimizing the storage capacity of a vehicle door pocket is provided. The vehicle door pocket has an opening formed on one side by a vehicle door and on the other side by a side wall. The insert includes a frame having a lip forming an opening substantially similar to the opening of the door pocket. The frame is fittable within the door pocket with the lip engaging the side wall and the vehicle door to support the frame within the door pocket. At least one partition is connected with the frame. The at least one partition is arranged to subdivide the frame into at least one compartment for storing variously shaped articles.

An adapter ring useable in a door pocket having an orientation within a motor vehicle is also provided. The adapter ring is suitable for supporting a configured bin of standard design within the door pocket irrespective of the orientation of the door pocket. The adapter ring includes a peripheral flange having an outer edge and an inner edge. The outer edge is adapted for cooperation with the door pocket to support the flange in the door pocket. The inner edge is adapted for cooperation with at least a portion of the configured bin to support the bin within the door pocket.

A vehicle door assembly is also provided in accordance with the present invention. The vehicle door assembly includes a vehicle door having a door pocket. The door pocket has an orientation relative to the vehicle door. The vehicle door assembly further includes an adapter ring. The adapter ring has an outer edge and an inner edge. The outer edge cooperates with the door pocket to support the ring in the door pocket. The inner edge cooperates with at least a portion of a first configured bin of standard design to support the bin within the door pocket irrespective of the orientation of the door pocket.

The advantages accruing to the present invention are numerous. For example, inserts transform a standard and ordinary door pocket into a personalized, flexible storage organizer that can hold a variety of items including coins, compact discs, umbrellas, flashlights, garage door openers, etc. in a systematic and organized fashion. The adapter ring may transform variously shaped door pockets among different models to a uniform shape so that a standard sized container may fit within the pockets of different vehicle models. The adapter ring may also transform variously shaped door pockets in a vehicle to a uniform shape so that a standard sized container may fit within the pockets of the vehicle.

The above objects and other objects, features, and advantages of the present invention will be readily appreciated by one of ordinary skill in the art from the following detailed description of the best modes for carrying out the invention when taken in conjunction with the accompanying drawings.

BEST MODES FOR CARRYING OUT THE INVENTION

Figure 1:
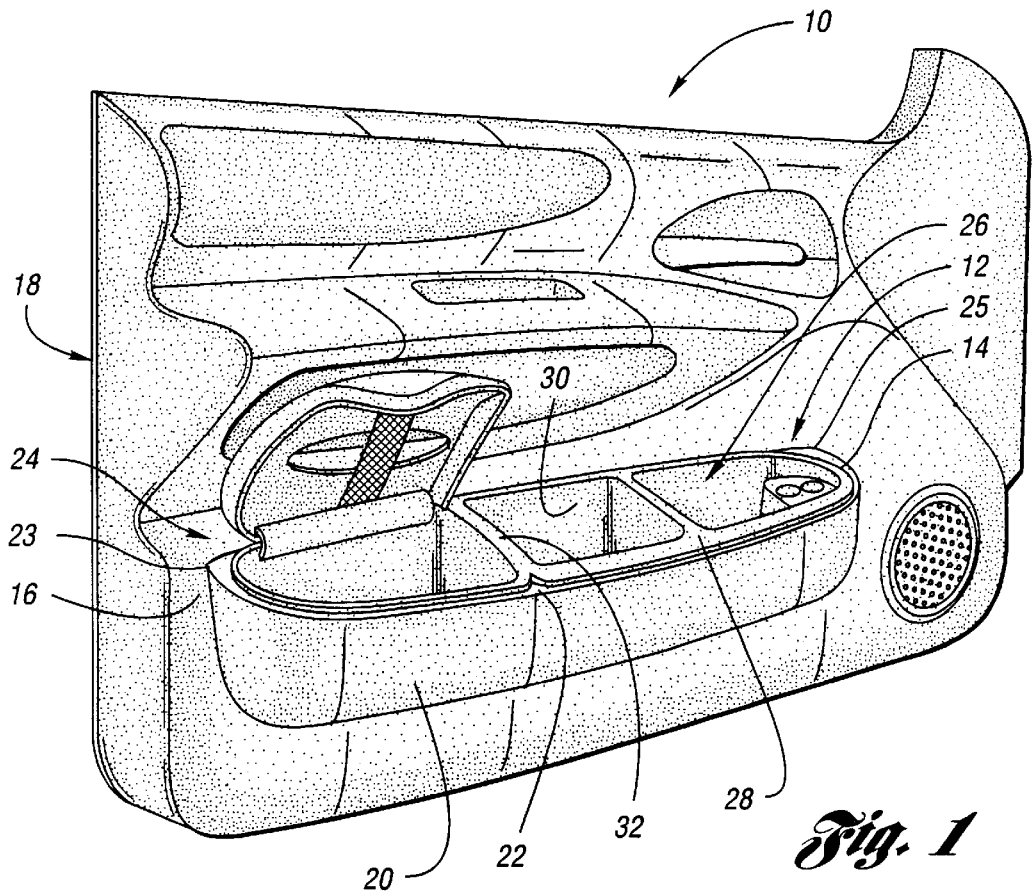
FIG. 1 is a perspective view of an insert according to the present invention fitted within a vehicle door pocket.

Referring now to FIG. 1, a vehicle door assembly 10 having a vehicle door pocket 12 is shown. Door pocket 12 has an opening 14 defined on one side by a lower portion 16 of a vehicle door 18 and on the other side by a side wall 20 having a top edge 22. Side wall 20 meets lower portion 16 at two junctures 23 and 25 to form door pocket opening 14.

An insert 24 having a frame 26 fittable within the door pocket 12 is provided for use with door assembly 10. As shown in FIG. 1, frame 26 is inserted within the entire door pocket 12. Frame 26 has a lip 28 defining an insert opening 30. Insert opening 30 has a shape substantially similar to door pocket opening 14 so that frame 26 is fittable within the entire door pocket 12. Of course, openings 14 and 30 do not have to be identically shaped. For instance, insert opening 30 may have a smaller shape than door pocket opening 14 so that frame 26 is fittable within only a portion of door pocket 12.

Lip 28 engages top edge 22 of side wall 20 and lower portion 16 of vehicle door 18 when frame 26 is fitted within door pocket 12. Consequently, frame 26 may be partitioned in any arrangement to subdivide door pocket 12. Partitions 32 are arranged to subdivide frame 26 into at least one compartment for storing variously shaped articles. Partitions 32 are preferably integrally formed with frame 26.

Figure 2A:
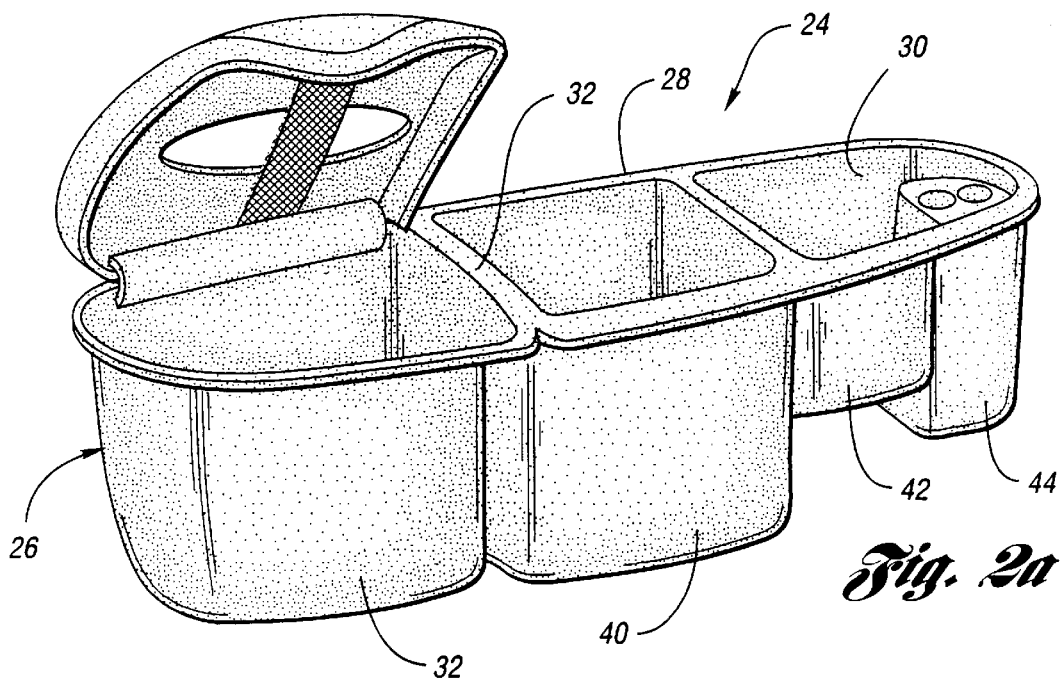
FIG. 2a is a perspective view of the insert shown in FIG. 1.
Figure 2B:
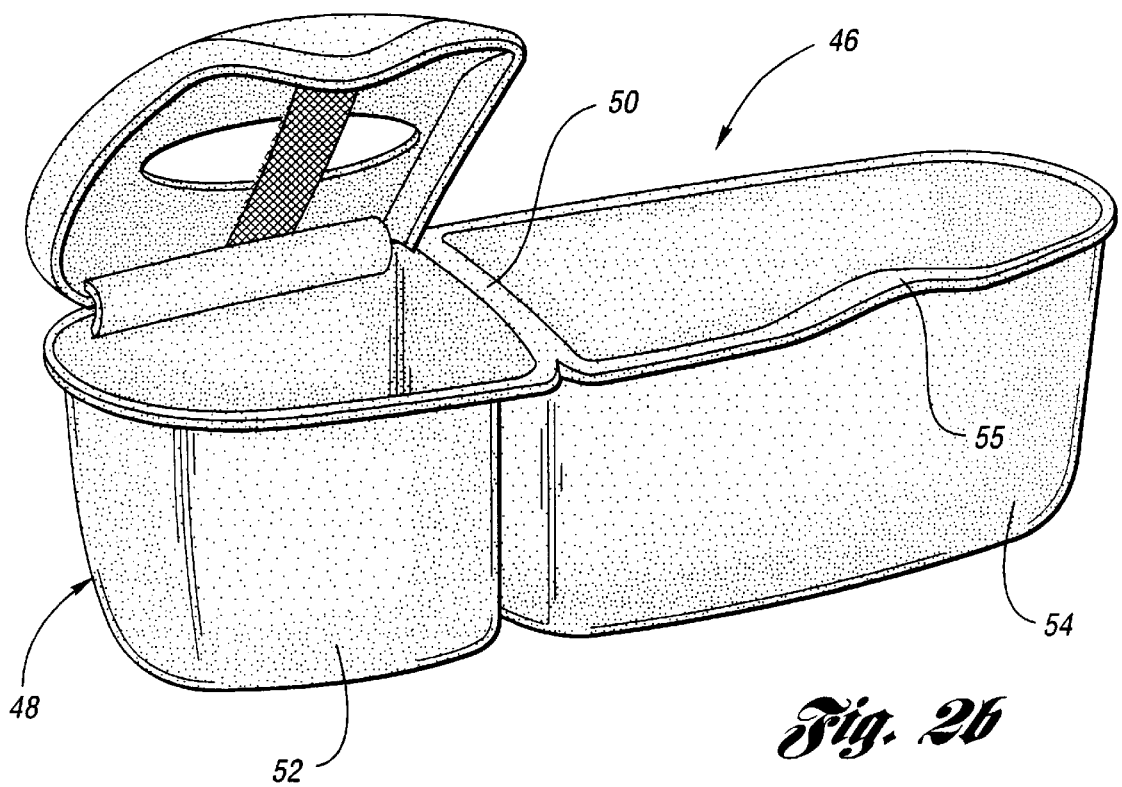
FIG. 2b is a perspective view of an alternative embodiment of the insert shown in FIG. 1.
Figure 2C:
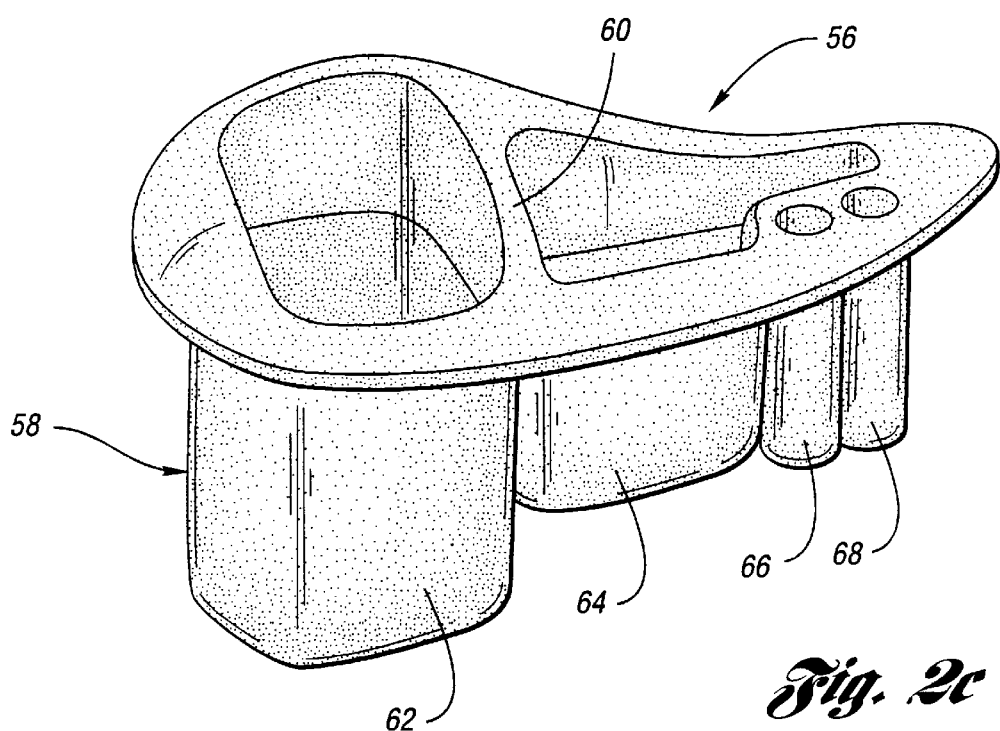
FIG. 2c is a perspective view of an alternative embodiment of the insert shown in FIG. 1.

Referring now to FIGS. 2a–2c, it will be appreciated that partitions 32 may be arranged in countless patterns to transform frame 26 into a customized one-piece storage container. Preferably, the customized containers are fittable within the entire door pocket 12.

With reference to FIG. 2a, insert 24 is provided with frame 26 having partitions 32 arranged to subdivide the frame into a tissue dispenser 38, a storage bin 40, a notepad and calculator container 42, and a pen and pencil container 44 as shown.

FIG. 2b shows a second embodiment 46 of the insert. Insert 46 has a frame 48 with a partition s0 subdividing the frame two compartments. The two compartments are a tissue dispenser 52 and a garbage bin 54. Garbage bin 54 has a tab 55 to facilitate easy removal of frame 48 from door pocket 12.

FIG. 2c shows a third embodiment 56 of the insert. Insert 56 has a frame 58 with partitions 60. Partitions 60 are arranged to subdivide frame 58 into a cell phone bin 62, a notepad and calculator container 64, and a pen and pencil holder 66 and 68.

Figure 3A:
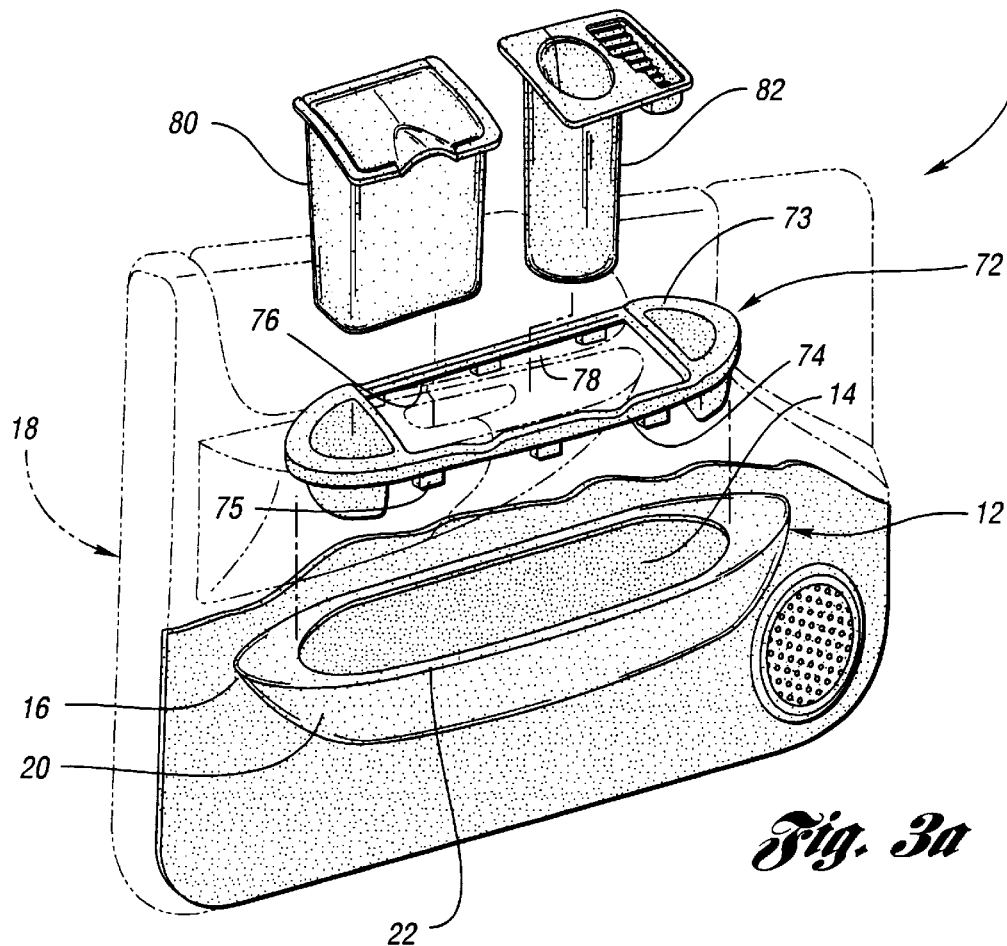
FIG. 3a is an exploded perspective view of a vehicle door assembly according to the present invention.
Figure 3B:
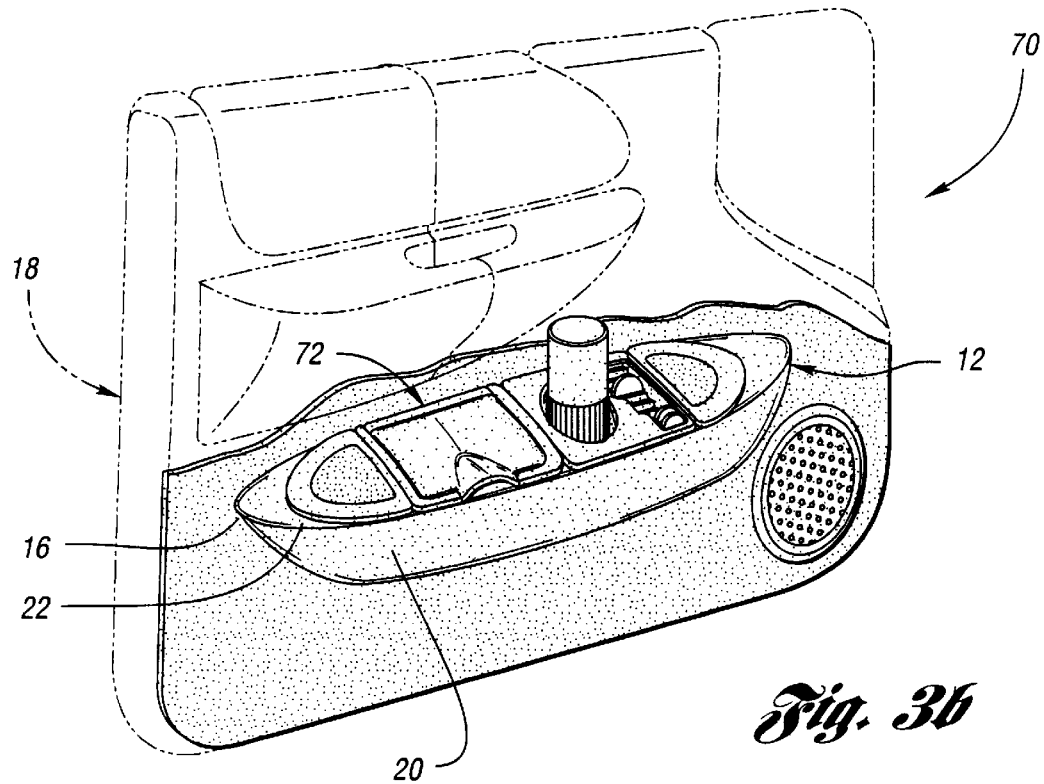
FIG. 3b is a perspective view of the vehicle door assembly shown in FIG. 3a with an adapter ring and configured bins fitted within the door pocket.

Referring now to FIGS. 3a–3b, a second embodiment 70 of a vehicle door assembly is shown. Vehicle door assembly 70 includes many of the same elements shown in FIG. 1. These elements have been designated with the same reference numerals and for simplicity will not be reintroduced here. Vehicle door assembly 70 further includes an adapter ring 72. Adapter ring 72 is fittable within door pocket 12.

Door pocket 12 has an orientation relative to vehicle door 18. The orientation of door pocket 12 depends on the shape of door pocket opening 14. The orientation of driver-side and passenger-side door pockets within a vehicle are typically similarly shaped, but are mirror images or are the opposite from one another. As will be described in greater detail below, adapter ring 72 may be fittable within both driver-side and passenger-side door pockets to transform their orientations to a standard orientation. Accordingly, configured bins of standard design suitable for use with the standard orientation may be fitted within either driver-side or passenger-side door pockets.

Adapter ring 72 may also be fittable within variously shaped door pockets among different vehicle models to transform the variously shaped pockets to a uniform shape. Accordingly, configured bins of standard design suitable for use with the uniform shape may be fitted within the variously shaped door pockets.

Adapter ring 72 is provided with a peripheral flange 73. Peripheral flange 73 has an outer edge 74 and an inner edge 76. Outer edge 74 is adapted for contiguous cooperation with door pocket opening 14. Outer edge 74 supports adapter ring 72 in door pocket 12. In a preferred embodiment, adapter ring 72 has a set of tabs 75 extending beneath peripheral flange 73 to retain adapter ring 72 within door pocket 12. In a further preference, peripheral flange 73 has a gripping portion 77 to facilitate easy removal of adapter ring 72 from door pocket 12.

Inner edge 76 of peripheral flange 73 defines an adapter ring opening 78 adapted for contiguous cooperation with at least a portion of a configured bin 80 of standard design to support the bin within door pocket 12 irrespective of the orientation or shape of the pocket. Adapter ring opening 78 transforms the shape of door pocket opening 14 into a standard sized opening so that adapter ring 72 may hold configured bins of standard design. More bins such as a second bin 82 may cooperate with inner edge 76 to be supported by adapter ring 72. Bins 80 and 82 may be integral with each other.

Adapter ring 72 is suitable for receiving a configured bin of standard design irrespective of the orientation or shape of door pocket 12. Thus, a bin of standard design that could not fit properly within either a driver-side or passenger-side pocket can fit properly within both pockets with the use of adapter ring 72. Furthermore, a bin of standard design that could not fit properly within variously shaped door pockets among different vehicle models may fit properly within these pockets with the use of adapter ring 72.

In essence, without the use of adapter ring 72, a pair of customized bins would be needed for similar arbitrarily shaped mirror image driver-side and passenger-side door pockets. One of the customized bins fits properly within the driver-side door pocket while the other one of the customized bins fits properly within the passenger-side door pocket. However, neither customized bin would fit properly within the other door pocket unless the bin is rotated 180° and an opposite front-to-back arrangement is tolerable. Because there are so many types of bins, many pairs of customized bins would be needed to be made for the pair of door pockets. Further, because there are so many differently shaped door pockets among vehicle models, more customized bins would need to be made.

Adapter ring 72 transforms the unique opening of a door pocket into a standard sized opening which can hold configured bins of standard design. Thus, only one standard design bin need be made for a pair of mirror imaged door pockets with the use of adapter ring 72 rather than a pair of customized bins. This reduces the amount of bins which need to be made by about one-half, which is a strong advantage of the present invention because there are so many bin designs.

Adapter ring 72 is fittable within door pocket 12 depending on the orientation or shape of the door pocket. For example, one adapter ring may have an outer edge adapted for contiguous cooperation with a driver-side door pocket. A second adapter ring may have an outer edge adapted for contiguous cooperation with a passenger-side door pocket. The second adapter ring is unable to fit within the driver-side door pocket because its outer edge cannot cooperate with the pocket. The two adapter rings will have outer edges which are mirror images from each other. In any event, only two different types of adapter rings need be made for the pair of door pockets rather than an extra set of customized bins. Of course, only one type of adapter ring need be made for certain situations. For instance, if the door pockets are symmetrical, an adapter ring which fits within a driver-side door pocket may be flipped upside down so that it can fit within a passenger-side door pocket.

Bins 80 and 82 act to subdivide door pocket 12 into separate compartments for storing articles. As can be appreciated, these bins can be mixed and matched with other bins such as those shown in FIGS. 4a–4f as space will allow. These bins are configured of a standard design, preferably in a rectangular shape, to engage inner edge 76 of adapter ring 72.

Adapter ring 72 may take on any other shape as wanted so long as it can fit within a portion of a door pocket and support a configured bin of standard design. Also, as disclosed by the present invention, adapter ring 72 may be adapted to cooperate with other pockets in a vehicle such as arm rest pockets and other consoles.

Figure 4A:
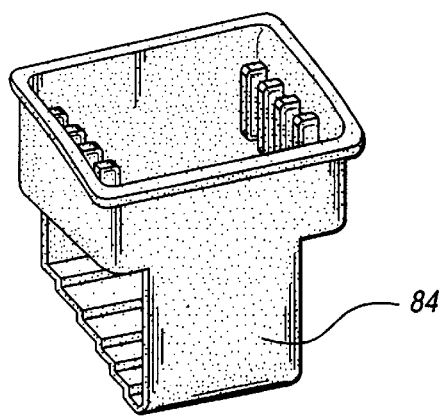
FIGS. 4a–4f show six different embodiments of standard sized bins useable with the adapter ring.
Figure 4B:
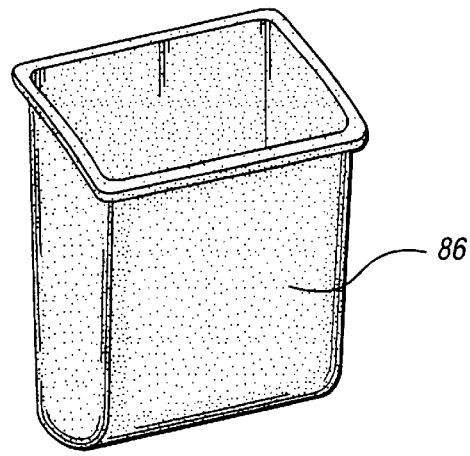
Figure 4C:
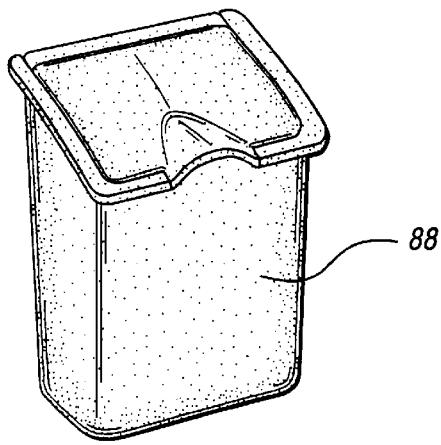
Figure 4D:
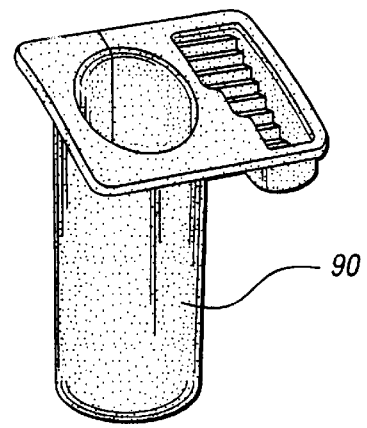
Figure 4E:
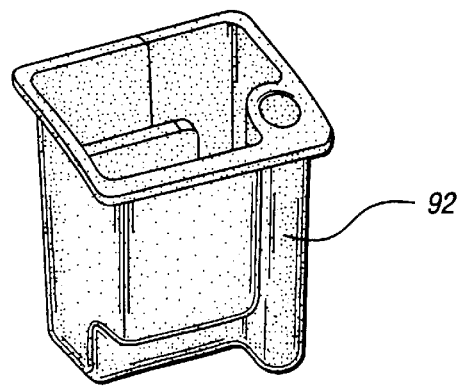
Figure 4F:
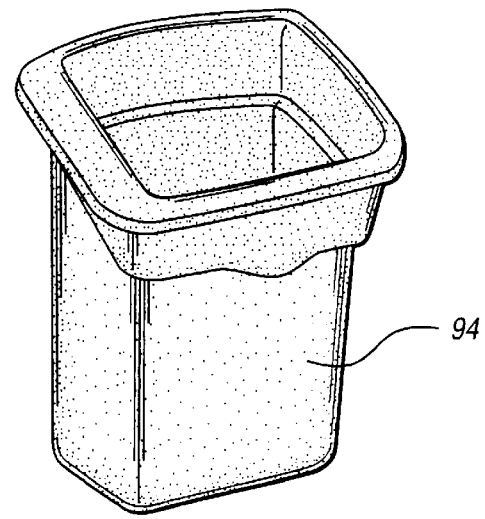

FIGS. 4a–4f show the various types of configured bins useable with adapter ring 72 to transform door pocket 12 into a customized container. FIG. 4a shows a CD holder 84, FIG. 4b shows a storage bin 86, FIG. 4c shows a trash bin 88 with a lid, FIG. 4d shows an umbrella/coin holder 90, FIG. 4e shows a notepad, pen and calculator organizer 92, and FIG. 4f shows a large trash bin 94.

Many other types of bins may be used with adapter ring 72 such as a tissue dispenser, a garage door opener holder, a flashlight holder, etc. Preferably, the bins and the adapter ring are injection molded.

This fabrication technique allows the bins and the rings to be produced to match the interior color of a vehicle and offered in different combinations to consumers through kits sold by vehicle dealers at a reasonable cost.

It is to be understood, of course, that while the forms of the present invention described above constitute the preferred embodiments of the present invention, the preceding description is not intended to illustrate all possible forms thereof. It is also to be understood that the words used are words of description, rather than limitation, and that various changes may be made without departing from the spirit or scope of the present invention, which should be construed according to the following claims.

What is claimed is:

1. An insert for optimizing the storage capacity of a vehicle door pocket, wherein the door pocket has an opening formed on one side by a vehicle door and on the other side by a side wall, the insert comprising:

a frame having a lip forming an opening substantially similar to the opening of the door pocket, the door pocket being situated apart from an arm rest of the vehicle door, the frame being fittable within the door pocket with the lip engaging the side wall and the vehicle door to support the frame within the door pocket; and at least one partition connected with the frame and arranged to subdivide the frame into at least two compartments for storing variously shaped articles.

2. The insert of claim 1 wherein:

the frame is injection molded.

3. The insert of claim 1 wherein:

the frame has a tab extending out from the lip to facilitate removal from the door pocket.

4. An adapter ring useable in a door pocket situated apart from an arm rest of the vehicle door and having an orientation within a motor vehicle for supporting a configured bin of standard design within the door pocket, the adapter ring comprising:

a peripheral flange having an outer edge adapted for cooperation with the door pocket to support the flange in the door pocket and an inner edge adapted for cooperation with at least a portion of the configured bin to support the bin within the door pocket.

5. The ring of claim 4 wherein:

the flange is injection molded.

6. The ring of claim 4 wherein:

the outer edge of the flange has a set of tabs to facilitate retention in the door pocket.

7. The ring of claim 4 wherein:

the flange has a gripping portion to facilitate removal from the door pocket.

8. A vehicle door assembly comprising:

a vehicle door having an arm rest and a door pocket situated apart from the arm rest, the door pocket having an orientation relative to the vehicle door; and an adapter ring having an outer edge and an inner edge, the outer edge cooperating with the door pocket to support the ring in the door pocket and the inner edge cooperating with at least a portion of a first configured bin of standard design to support the bin within the door pocket.

9. The assembly of claim 8 wherein:

the first configured bin subdivides the door pocket.

10. The assembly of claim 8 wherein:

the inner edge of the adapter ring cooperates with at least a portion of a second configured bin of standard design to support the second bin within the door pocket irrespective of the orientation of the door pocket.

11. The assembly of claim 10 wherein:

the first configured bin is connectable with the second configured bin.

12. The assembly of claim 8:

wherein the adapter ring is injection molded.

13. The assembly of claim 8 wherein:

the adapter ring has a set of tabs to facilitate retention in the door pocket.

14. The assembly of claim 8 wherein:

the adapter ring has a gripping portion to facilitate removal from the door pocket.

* * * * *